(12) United States Patent
Sheu et al.

(10) Patent No.: US 7,861,399 B2
(45) Date of Patent: Jan. 4, 2011

(54) TOOL FOR LOADING A HEAD ONTO A DISK OF A HARD DISK DRIVE

(75) Inventors: Ming-Goei Sheu, Cupertino, CA (US); YuQing Niu, Shenzhen (CN)

(73) Assignee: ESGW Holdings Limited, Tortola (VG)

( * ) Notice: Subject to any disclaimer, the term of this patent is extended or adjusted under 35 U.S.C. 154(b) by 0 days.

(21) Appl. No.: 12/454,219

(22) Filed: May 14, 2009

(65) Prior Publication Data

US 2009/0223040 A1    Sep. 10, 2009

Related U.S. Application Data

(62) Division of application No. 11/712,876, filed on Mar. 1, 2007, now Pat. No. 7,536,771, which is a division of application No. 10/750,017, filed on Dec. 31, 2003, now Pat. No. 7,197,812.

(51) Int. Cl.
*G11B 5/127* (2006.01)
*H04R 31/00* (2006.01)

(52) U.S. Cl. .............. 29/603.03; 29/603.04; 29/603.07; 360/240; 360/244.2; 360/244.8; 360/294.4; 360/294.7

(58) Field of Classification Search .............. 29/603.03, 29/603.04, 603.06, 603.07; 360/240, 244, 360/244.2, 244.8, 294.4–294.7
See application file for complete search history.

(56) References Cited

U.S. PATENT DOCUMENTS

| 4,901,430 | A | * | 2/1990 | Noguchi et al. | .......... | 29/603.06 |
| 5,289,325 | A | * | 2/1994 | Morehouse et al. | ...... | 360/254.8 |
| 6,032,352 | A | * | 3/2000 | Furay et al. | .............. | 29/603.03 |
| 6,941,642 | B1 | * | 9/2005 | Subrahmanyam et al. | ....................... | 29/603.03 |

* cited by examiner

*Primary Examiner*—Paul D Kim
(74) *Attorney, Agent, or Firm*—Saile Ackerman LLC; Stephen B. Ackerman

(57) ABSTRACT

A method for loading single head in a hard disk drive includes the following steps: mounting a head assembly (30) in a baseplate (10) of a hard disk drive, the head assembly comprising an actuator arm (32), a suspension (34) and a HGA, the baseplate engaging a motor (110) and the HGA is positioned close to the motor; biasing the suspension by a mounting tool (50) from the original position, the mounting tool comprising a cantilever arm (52), a pressing head (54) and a supporting rod (56), wherein the mounting tool rotates to the suspension and gets down to press the suspension; mounting a disk (90) on the motor in the baseplate; and releasing the pressing head from the suspension, loading the HGA of the head assembly to a parking zone of the disk.

3 Claims, 3 Drawing Sheets

TOOL FOR LOADING A HEAD ONTO A DISK OF A HARD DISK DRIVE

This application is a Divisional of U.S. patent application Ser. No. 11/712,876, filed on Mar. 1, 2007 now U.S. Pat. No. 7,536,771, which is a Divisional of U.S. patent application Ser. No. 10/750,017, filed on Dec. 31, 2003, now issued as U.S. Pat. No. 7,197,812, which are assigned to a common assignee and herein incorporated by reference in their entirety.

BACKGROUND OF THE INVENTION

1. Field of the Invention

The present invention generally relates to a method for loading a single head in a hard disk drive with a head loading mechanism, and more particularly to a method and mechanism for loading a single head directly onto the parking zone at an inner diameter of a hard disk.

2. Description of the Related Art

Various data storage devices are installed in electronic apparatus for communication and handling of data. Such devices include, for example, hard disk drives, floppy disk drives and Compact Disk-Read Only Memory (CD-ROM) drives. As computers have evolved into more sophisticated computer systems with smaller dimensions and lighter weight, efforts have been directed at providing increasing amounts of data storage with smaller weight or physical dimensions.

Conventionally, a hard disk drive contains a plurality of magnetic disks for storage of data, mounted onto a spindle motor and rotated by the spindle motor at high speed. A plurality of heads magnetize and sense the magnetic field of the disks and are imbedded into sliders which. In turn, are connected to corresponding suspensions by corresponding gimbals. The suspensions are connected with an actuator arm. The heads are suspended at distal ends of the suspensions over the disks, and read the data from the disks and pass it to the drive electronics so it can be transferred to the computer.

In conventional manufacturing of hard disk drives, the head stack is pre-assembled, and every two adjacent heads are positioned face to face so as to sense magnetic fields of a disk from two sides thereof. A tool forming multiple isolating arms, is used to separate the adjacent two heads face to face for avoiding damages of the heads. The magnetic disks are preloaded in a baseplate of a hard disk drive on a spindle motor. The heads are merged with the disks from the outer diameter of the disk of the data zone after the disks are settled down, then the tool is detached and the heads are moved to the parking zone of the inner diameter of the disk while the disk are rotating.

However, the typical method for loading heads in hard disk drives has risk to damage the valuable data zone on the disks especially at the outer diameter when the heads are firstly loaded onto the disks. Moreover, the conventional method requires additional electricity to drive the spindle motor to rotate at high speed, and requires corresponding controlling electronics to control turning on or off the spindle motor to actuate rotation of the disks or stop rotation of the disks in order to load the heads. Furthermore, nowadays there is no need of multiple disks, for only one disk or even one side of a disk is competent for capacity requirement with the improvement of disk density technology.

It is thus desirable to provide a method for loading a single head to a single disk in a hard disk drive for the problems discussed above.

SUMMARY OF THE INVENTION

Accordingly, an object of the present invention is to provide a method for loading a single head in a hard disk drive with a head loading mechanism, and another object is to provide a method for loading a single head directly onto the parking zone at an inner diameter of a hard disk.

To achieve the above objects, a method for loading a single head in hard disk drives includes the following steps: mounting a head assembly in a baseplate of a hard disk drive, the head assembly comprising an actuator arm, a suspension and a head gimbal assembly (HGA), the baseplate engaging a motor and the HGA is positioned close to the motor; biasing the suspension by a mounting tool from the original position, the mounting tool comprising a cantilever arm, a pressing head and a supporting rod, wherein, the mounting tool rotates to the suspension and gets down to press the suspension; mounting a disk on the motor in the baseplate; and releasing the pressing head from the suspension, loading the HGA of the head assembly to a parking zone of the disk.

Other objects, advantages and novel features of the present invention will be drawn from the following detailed description of preferred embodiments of the present invention with the attached drawings, in which:

DETAILED DESCRIPTION OF THE INVENTION

Figure 1:
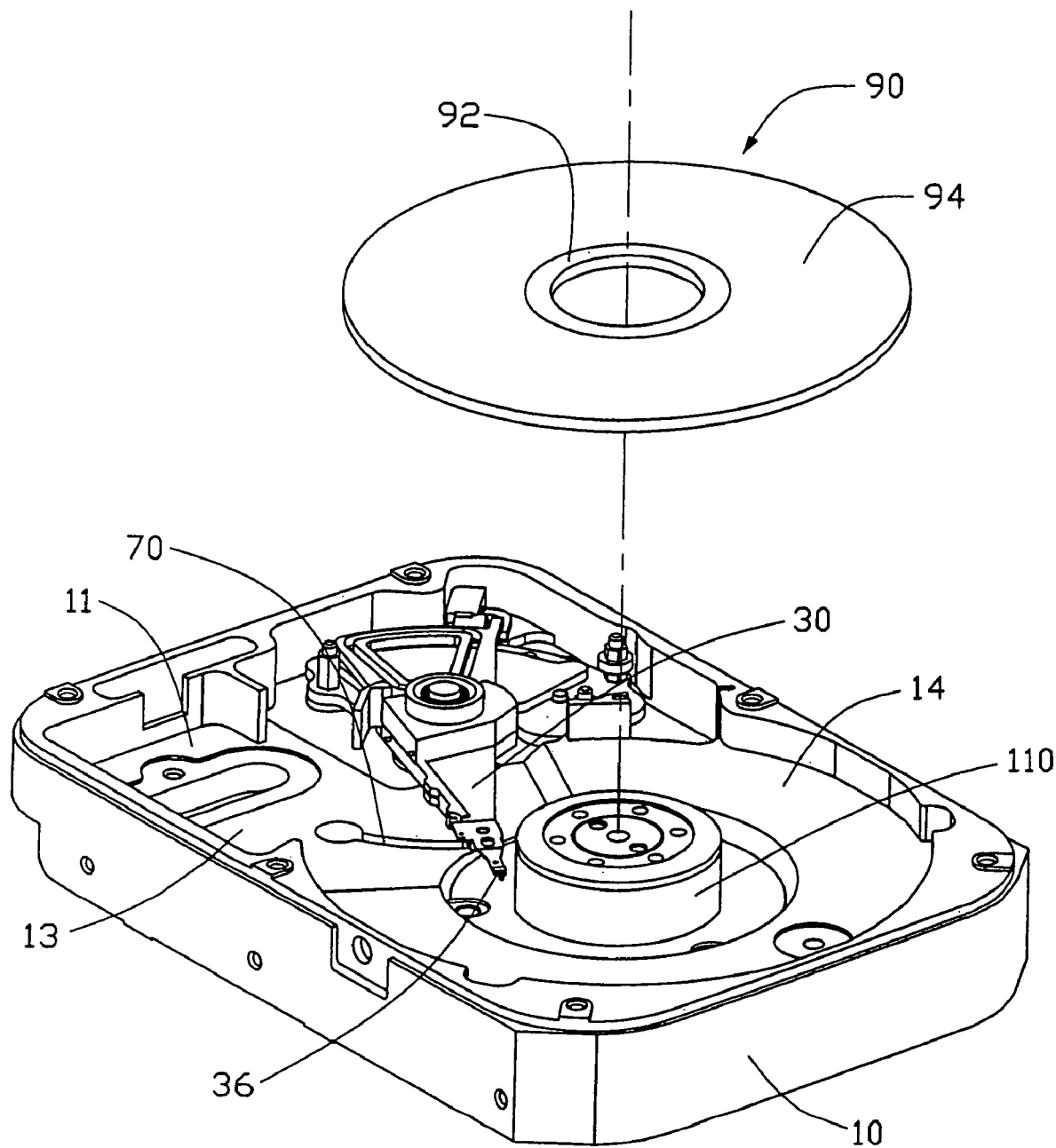
FIG. 1 is an exploded, isometric view of a hard disk drive in accordance with a preferred embodiment of the present invention.
Figure 2:
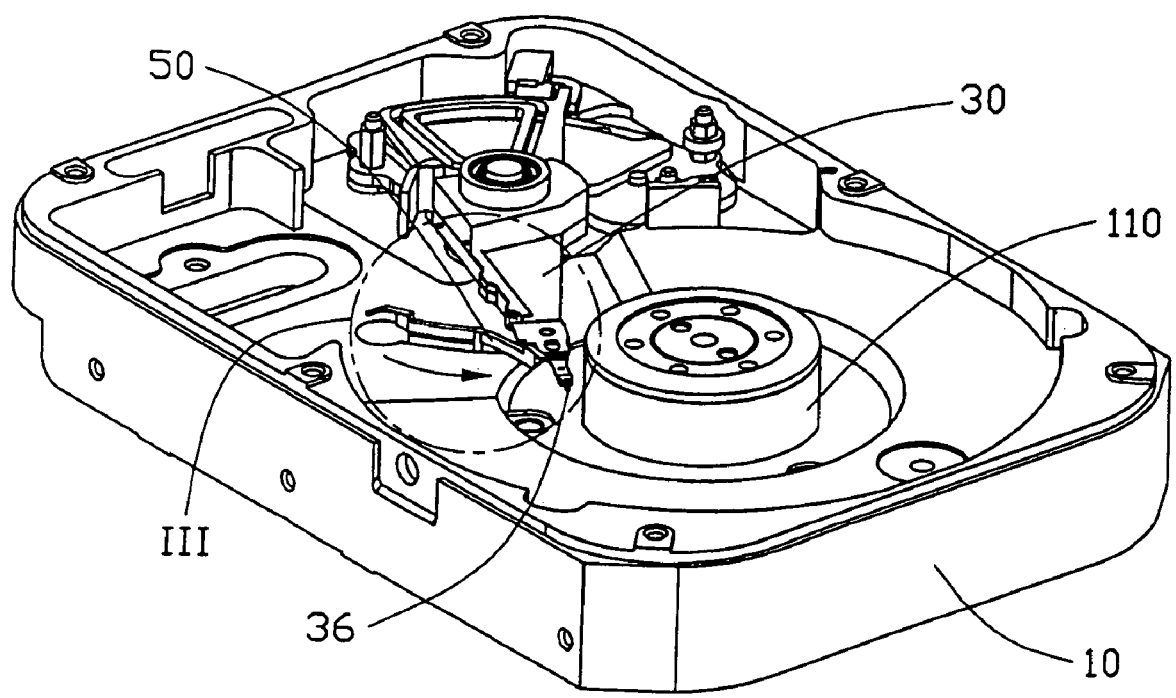
FIG. 2 is similar to FIG. 1, but shows the movement trace of a mounting tool of the hard disk drive.
Figure 3:
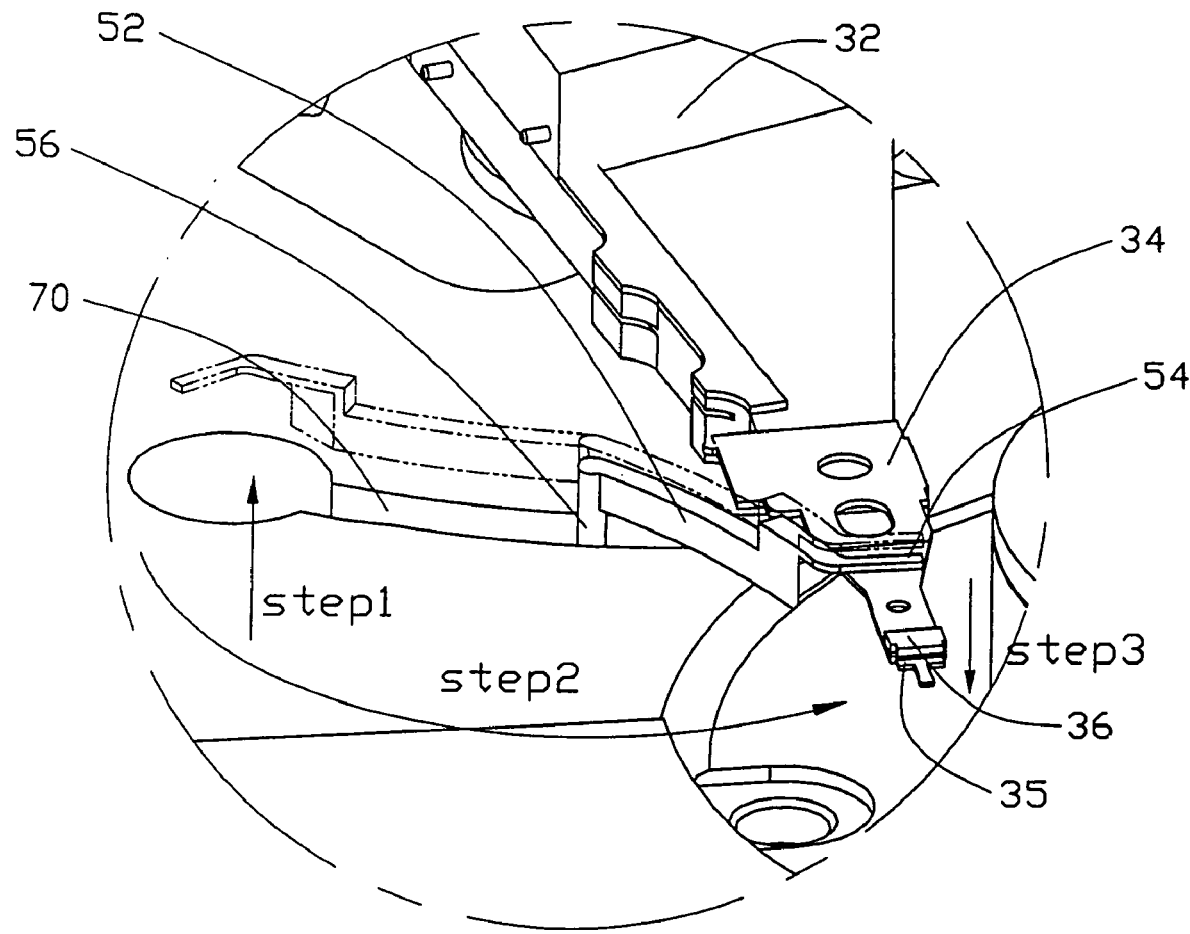
FIG. 3 is an enlarged view of an encircled portion III of FIG. 2, showing steps for loading a single disk of the present invention.

Referring to FIGS. 1, 2 and 3, a hard disk drive in accordance with a preferred embodiment of the present invention comprises a baseplate 10, a single head assembly 30, a magnetic disk 90, a spindle motor 110, and a mounting tool 50.

The hard disk 90 comprises a parking zone 92 and a data zone 94. The parking zone 92 is designed for resting a head gimbal assembly (HGA) while the hard disk drive is not storing or retrieving data. The baseplate 10 of the hard disk drive forms a separator 11 in a center portion thereof defining a data storage housing 13 and a controller housing (not shown). Generally a connector and a circuit board are received in the controller housing. The data storage housing 13 defines a round recess 14 for receiving the disk 90, wherein the spindle motor 110 is supported in a central portion of the recess 14. An arc-shaped servo writing slot 70 for guiding a push pin (not shown) is defined through the separator 11 and in communication with the round recess 14 in radial direction for guiding a servo writing push pin (not shown). The slot 70 is useful in the method for loading a single head in a hard disk drive of the present invention so as to simplify the configuration and processing of the baseplate 10. The single head assembly 30 comprises an actuator arm 32, a suspension 34, and the HGA. The actuator arm 32 is rotatably mounted to the baseplate 10 driven by a flexible printed circuit (not shown). The suspension 34 is connected to the actuator arm 32. The HGA comprises a slider 35 and a magnetic head 36. The slider 35 is flexibly engaged with the suspension 34 at a distal end thereof. The head 36 attached on the slider 35.

The mounting tool 50 is configured corresponding to the shape of the slot 70, so that the mounting tool 50 can get through the slot 70 to load the HGA to the parking zone 92 of the disk 90. The mounting tool 50 comprises a supporting rod 56, a cantilever arm 52 extending from a top end of the supporting rod 56, and a pressing head 54 bent from a free end of the cantilever arm 52 so as to exert a suitable force onto the suspension 34. The supporting rod 56 is fixed to a fixture (not shown), and can be rotated along with the fixture. The fixture can be driven upwards or downwards by a step servo system (not shown); simultaneously the mounting tool 50 is driven to perform a vertical ascending step and a descending step. A base motor (not shown) drives the fixture together with the mounting tool 50 to perform a rotating step.

A method for loading the single head in the hard disk drive comprises the following steps: first, mounting the single head assembly 30 to the baseplate 10; second, the mounting tool 50 getting through the servo writing slot 70 and pressing the single head assembly 30 down; third, mounting a single disk 90 onto the motor 110; forth, releasing the mounting tool 50 so as to load the HGA of the head assembly 30 to the parking zone 92.

The method for loading the single head 36 in the hard disk drive of the present invention utilizes the mounting tool 50 to press down the suspension 34 in order to leave suitable space for mounting the disk 90 without touching the HGA of the single head assembly 30, or release the suspension 34 after the disk 90 is engaged on the motor 110.

After the single head assembly 30 is mounted into the baseplate 1, the suspension 34 is rotated to approach the spindle motor 110 until the HGA is positioned in close proximity to the motor 110, wherein the parking zone 92 of the disk 90 is located above. As long as the depressed suspension 34 is released, the HGA at the distal end of the suspension 34 can be vertically loaded in parking zone 92 of the magnetic disk 90. In loading the head 36, the mounting tool 50 is raised by the step servo system, getting through the servo writing slot 70, as shown in step 1 of FIG. 3, and then rotated in anti-clockwise direction then rotates toward the suspension 34 as shown in step 2 of FIG. 3. By this time, the pressing head 54 of the mounting tool 50 locates above on the suspension 34. and then the step servo system hauls the mounting tool 50 downwardly as shown in step 3 of FIG. 3, simultaneously the suspension 34 being pressed down to leave suitable space for mounting magnetic disk 90.

After the disk 90 is mounted on the spindle motor 110, the pressing head 54 of the mounting tool 50 releases the suspension 34. The releasing of the suspension 34 comprises the following steps: raising the mounting tool 50 by the step servo system, simultaneously the resilient suspension 34 springing back to the bottom of the disk 90 and loading the HGA on the parking zone 92; rotating the mounting tool 50 in clockwise direction until the mounting tool 50 aligns with the servo writing slot 70; hauling the mounting tool 50 down by the step servo system to get through the servo writing slot 70, and exiting the housing 13 of the baseplate 10.

While the present invention has been illustrated by the description of preferred embodiments thereof, and while the preferred embodiments have been described in considerable detail, it is not intended to restrict or in any way limit the scope of the appended claims to such detail Additional advantages and modifications within the spirit and scope of the present invention will readily appear to those skilled in the art. Therefore, the present invention is not limited to the specific details and illustrative examples shown and described.

What is claimed is:

1. A tool for loading a head onto a disk of a hard disk drive comprising:
    (a) a cantilever arm with a pressing portion formed from a distal end thereof, said cantilever arm to exert a force on a suspension attached to an actuator arm mounted on a baseplate of said hard disk drive, said head being attached to a distal end thereof, and wherein the cantilever arm extends a supporting rod at another distal end thereof, said supporting rod being capable of vertical and rotational movement;
    (b) wherein said baseplate defines a slot, corresponding to said tool so that said tool may be inserted and withdrawn through said baseplate; and
    (c) wherein said cantilever arm may be vertically moved so that the pressing portion displaces the suspension sufficiently upwards, above the baseplate, to provide enough space to insert a disk under the head.

2. The tool as claimed by claim 1 wherein the slot is arc shaped.

3. The tool as claimed by claim 1 wherein the vertical and rotational movements of the tool are accomplished by manipulating said tool through said slot.

* * * * *